United States Patent [19]

Matsuoka

[11] 4,372,579
[45] Feb. 8, 1983

[54] PASSIVE SEAT BELT ARRANGEMENT FOR A VEHICLE

[75] Inventor: Hideoki Matsuoka, Yokohama, Japan

[73] Assignee: Nissan Motor Co., Ltd., Yokohama, Japan

[21] Appl. No.: 206,988

[22] Filed: Nov. 14, 1980

[30] Foreign Application Priority Data

Nov. 19, 1979 [JP] Japan .......................... 54-160191[U]

[51] Int. Cl.³ ............................................ B60R 21/10
[52] U.S. Cl. .................................................. 280/802
[58] Field of Search ....................... 280/802, 803, 808; 297/496

[56] References Cited

U.S. PATENT DOCUMENTS

| | | | |
|---|---|---|---|
| 3,850,446 | 11/1974 | Hogensen | 280/802 |
| 4,004,829 | 1/1977 | Kato et al. | 280/802 |
| 4,159,834 | 7/1979 | Miller et al. | 280/802 |
| 4,225,156 | 9/1980 | Barnett | 280/804 |

Primary Examiner—Robert R. Song

[57] ABSTRACT

A belt supporting member mounted on an inner side of a hinged door of a vehicle is constructed of a resilient wire and comprises a base portion fixed to the inner side of the door, a fulcrum portion extending from the base portion, a hair-pin portion extending downwardly from the fulcrum portion, a straight portion extending upwardly from the hair-pin portion while making an obtuse angle relative to the hair-pin portion, and a belt supporting portion extending from the straight portion for supporting thereon a portion of the belt. The connection of the belt supporting member to the door is such that when no external force is applied to the belt supporting member, the hair-pin portion is raised by a certain angle from the inner side of the door permitting the straight portion to lie on the inner side of the door by making the fulcrum portion act as a fulcrum. A blocking member is mounted to the vehicle body at a portion to which the top of the hair-pin portion is engageable upon closing of the door.

5 Claims, 7 Drawing Figures

PASSIVE SEAT BELT ARRANGEMENT FOR A VEHICLE

FIELD OF THE INVENTION

The present invention relates in general to a safety device which is mounted in a motor vehicle for protecting passengers upon a vehicle collision, and more particularly to a passive seat belt arrangement which operates to restrain a seated passenger and release him or her from the seat belt in response to closing and opening of the vehicle door.

SUMMARY OF THE INVENTION

It is an object of the present invention to provide a passive seat belt arrangement which is simple in construction and inexpensive in production.

It is another object of the present invention to provide a passive seat belt arrangement which is constructed not to obstruct the ingress and egress of the passenger into and from the passenger compartment.

According to the present invention, there is provided a passive seat belt arrangement for a vehicle having a door hinged to the body of the vehicle. The passive seat belt arrangement comprises a first belt having one end fixed to a portion of the vehicle and the other end fixed to the door, a second belt having at its one end a through ring through which the first belt passes to be divided into a shoulder restraining section and a lap restraining section, a belt retractor mounted in the vehicle to retract the second belt, a belt supporting member constructed of a resilient wire and connected to an inner side of the door, the belt supporting member including a base portion fixed to the inner side of the door, a fulcrum portion extending from the base portion, a hair-pin portion extending downwardly from the fulcrum portion to form a hair-pin construction, a straight portion extending upwardly from the hair-pin portion while making an obtuse angle relative to the hair-pin portion, and a belt supporting portion extending from the straight portion for supporting thereon a portion of the lap restraining section, the connection of the belt supporting member to the door being such that when no external force is applied to the belt supporting member, the hair-pin portion is raised by a certain angle from the inner side of the door permitting the straight portion to lie on the inner side of the door by making the fulcrum portion act as a fulcrum, and a blocking member mounted to the vehicle at a portion to which the top of the hair-pin portion is engageable upon closing of the door.

BRIEF DESCRIPTION OF THE DRAWINGS

Other objects and advantages of the present invention will become clear from the following description when taken in conjunction with the accompanying drawings, in which.

DESCRIPTION OF THE PRIOR ART

Figure 1:
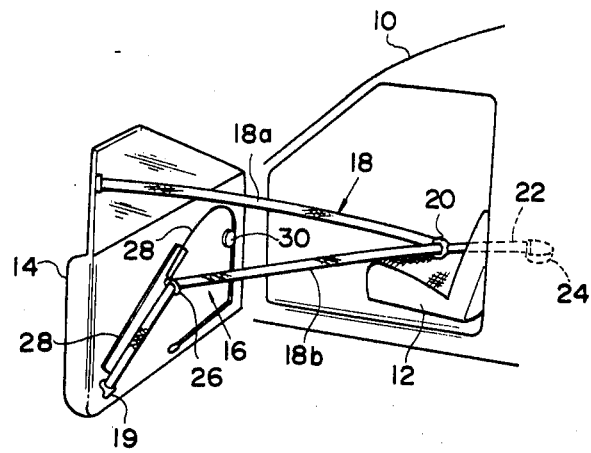
FIG. 1 is a view showing a conventional passive seat belt arrangement installed in a motor vehicle.

Prior to describing the construction of the invention, one conventional passive seat belt arrangement will be outlined with reference to FIG. 1 in order to clarify the invention.

Referring to FIG. 1 of the drawings, there is shown a typical example of conventional passive seat belt arrangements, which is installed in a motor vehicle. The vehicle shown comprises generally a body 10, a seat 12 mounted in the body 10, and a door 14 hinged at its front end to the body 10.

The seat belt arrangement, which is generally designated by numeral 16, comprises an elongate belt 18 having an upper end fixed to a rear-upper section of the door 14 and a lower end fixed via an anchor plate 19 to a rear-lower section of the door 14. The elongate belt 18 is divided into two sections, those are a shoulder restraining section 18a and a lap restraining section 18b, by a through ring 20 through which the belt 18 is passed. The through ring 20 is connected to an end of a short belt 22 biased to be retracted by a belt retractor 24 which is mounted on the inboard side of the seat 12. Usually, the belt retractor 24 is equipped with a so-called emergency locking mechanism which functions to inhibit the drawing of the belt 22 from the retractor 24 when sensing an abnormal deceleration of the vehicle. The lap restraining section 18b of the elongated belt 18 is passed through a guide ring 26 of a belt shifting mechanism mounted on the door 14. The belt shifting mechanism comprises a guide rail 28 diagonally mounted on the inner side of the door 14, along which the guide ring 26 moves. For moving the guide ring 26 along the guide rail 28 in both directions, a pushable wire 28 or the like is fixed to the guide ring 26, which is moved round the interior of the door by an electric motor 30. The electric motor 30 is controlled by a control unit (not shown) in such a manner that when the door 14 opens, the motor 30 runs in a direction to move the guide ring 26 in the forward direction thereby permitting easy ingress and egress of the passenger, but when the door 14 closes, the motor 30 runs in the other direction to move the guide ring 26 in the rearward direction thereby causing the seat belt to restrain the passenger, if seated.

However, in the conventional passive seat belt arrangement mentioned above, the construction of the belt shifting mechanism mounted on the door is complicated, thus inducing expensive production of the seat belt arrangement. Thus, wide usability of such arrangement is not expected.

DESCRIPTION OF THE INVENTION

To eliminate the drawback encountered in the above-mentioned conventional passive seat belt arrangement is an essential object of the present invention.

Figure 4:
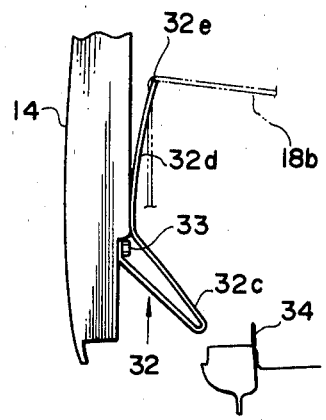
FIGS. 4 and 5 are views showing the respective conditions of the belt supporting member when the vehicle door opens and closes.
Figure 5:
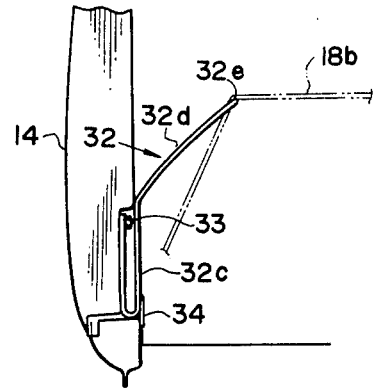

Referring to FIGS. 2 to 5, especially FIG. 5, there is shown a seat belt arrangement according to the present invention. The seat belt arrangement of the invention is substantially the same in construction as the above-mentioned conventional one except for the belt shifting mechanism. In other words, in the invention, a pivotable belt supporting member 32 is employed as a substitute for the belt shifting mechanism.

Figure 2:
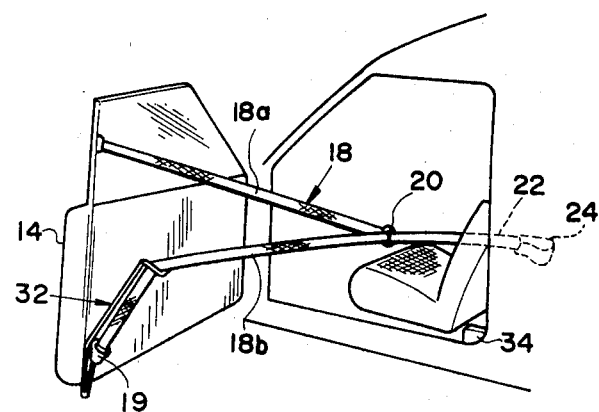
FIG. 2 is a view showing a first preferred embodiment of a passive seat belt arrangement according to the present invention.
Figure 3:
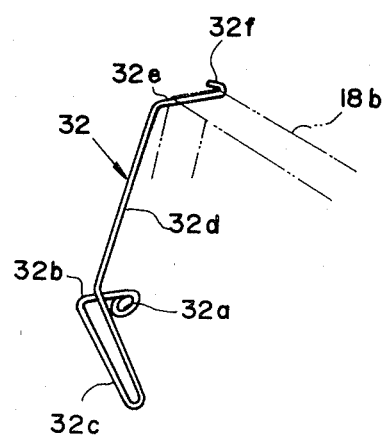
FIG. 3 is a view of a belt supporting member employed in the passive seat belt arrangement of FIG. 2.

As is shown in FIG. 2, the pivotable belt supporting member 32 is fixed at a portion thereof to the rear-lower section of the inner panel of the door 14. The belt supporting member 32 is constructed of a resilient metal wire, such as a piano wire, and comprises, as well shown in FIG. 3, a circled end portion 32a, a first straight portion 32b extending from the circled end portion 32a, a hair-pin portion 32c extending downward from the first straight portion 32b to form a hair-pin construction, a second straight portion 32d extending upward from the hair-pin portion 32c in a manner to be perpendicular to the first straight portion 32b making an obtuse angle relative to the hair-pin portion 32c, a third straight portion 32e extending from the second straight portion 32d to be parallel with the first straight portion 32b and a hooked portion 32f extending from the third straight portion 32e. The third straight portion 32e is slightly longer than the width of the belt 18, as is seen from FIG. 3. The belt supporting member 32 is connected to the door 14 by means of a connecting bolt 33 (see FIGS. 4 and 5) which passes through the circled end portion 32a thereof and is fixed to the door 14. Preferably, the connecting bolt may be a common one which connects the anchor plate 19 to the door 14. Now, it should be noted that the connection of the belt supporting member 32 to the door 14 is made such that when no external force is applied to the member 32, the hair-pin portion 32c is raised by a certain angle from the inner panel of the door 14 permitting the second straight portion 32d to lie on the inner panel by making the first straight portion 32b act as a fulcrum. As is well shown in FIG. 2 or 3, the lap restraining portion 18b of the belt 18 is put on the third straight portion 32e of the belt supporting member 32.

As will be seen from FIGS. 4 and 5, the vehicle body has at its side sill a plate 34 which is engageable with the curved portion of the hair-pin portion 32c of the belt supporting member 32 when the door 14 closes.

With the construction mentioned above, the seat belt arrangement of the invention operates as follows.

When the door 14 is kept slightly open with the hair-pin portion 32c disengaged from the plate 34 as shown in FIG. 4, the belt supporting member 32 assumes a condition as shown in the drawing in which the third straight portion 32e takes its uppermost position. When the door 14 is swung to largely open as shown by FIG. 2, the second straight portion 32d of the member 32 is raised from the inner panel of the door 14 by the belt 18 being biased toward the retractor 24. In this case, however, the degree of the raising is small because of the considerable resiliency of the belt supporting member 32, so that the lap restraining section 18b of the belt 18 is kept lifted adequately for providing the passenger with easy ingress and egress to the passenger compartment of the vehicle.

When the door 14 closes as shown in FIG. 5, the curved, lower end of the hair-pin portion 32c of the belt supporting member 32 is pressed upon the plate 34 thereby lowering the second straight portion 32d greatly, making the first straight portion 32b act as a fulcrum. Thus, the third straight portion 32e takes its lowermost position, so that the lap restraining section 18b of the belt 18 tightly restrains the phemoral region of the seated passenger.

Figure 6:
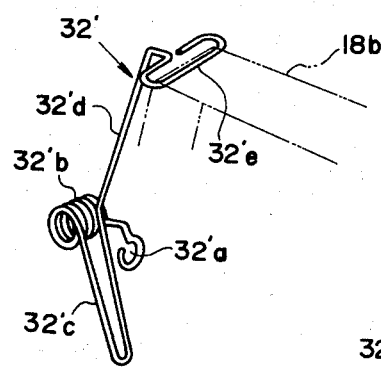
FIGS. 6 and 7 are views showing other belt supporting members employable in the passive seat belt arrangement of the present invention.

Referring to FIG. 6 of the drawings, there is shown a modification of the belt supporting member. The belt supporting member 32' of this modification comprises a circled end portion 32'a, a coiled portion 32'b extending from the circled end portion 32'a, a hair-pin portion 32'c extending downward from the coiled portion 32'b, a straight portion 32'd extending upward from the hair-pin portion 32'c, and an ovally circled end portion 32'e extending from the straight portion 32'd. Similar to the case of the belt supporting member 32 mentioned above, a connecting bolt is passed through the circled end portion 32'a, and fixed to the door 14 for connection of the belt supporting member 32' with the door 14, and the lap restraining section 18b of the belt 18 is passed through the ovally circled end portion 32'e. Thus, in this modification, the coiled portion 32'b acts as the fulcrum upon pivoting movement of the member 32'.

Figure 7:
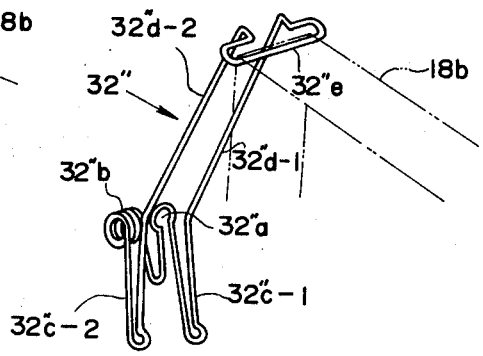

Referring to FIG. 7, there is shown another modification of the belt supporting member, which is constructed of an endless resilient wire. The belt supporting member 32" of this modification comprises a circled portion 32"a, a coiled portion 32"b extending from one end of the circled portion 32"a, a first hair-pin portion 32"c-1 extending downward from the other end of the circled portion 32"a, a second hair-pin portion 32"c-2 extending downward from the coiled portion 32"b, two straight portions 32"d-1 and 32"d-2 extending from both the hair-pin portions 32"c-1 and 32"c-2, and an ovally circled portion 32"e by which the two straight portions 32"d-1 and 32"d-2 are connected. Similar to the above-mentioned cases, a connecting bolt is passed through the circled portion 32"a and fixed to the door 14, and the lap restraining section 18b of the belt 18 is passed through the ovally circled portion 32"e, making the coiled portion 32"b act as a fulcrum upon pivotal movement of the member 32". With this double-constructed belt supporting member 32", the mechanical strength and the resiliency of it is increased as compared with the above-mentioned two belt supporting members 32 and 32'.

As is understood from the foregoing description, in accordance with the present invention, the ingress and egress of the passenger is easily made upon opening of the door and the restraining of the seated passenger by the seat belt is dependably achieved upon closing of the door, even though the seat belt arrangement of the invention has a simple and inexpensive construction.

What is claimed is:

1. A passive seat belt arrangement for a vehicle having a door hinged to the body of said vehicle, comprising:
   a first belt having one end fixed to an upper rear portion of said door and the other end fixed to a lower rear portion of said door;
   a second belt having at its one end a through ring through which said first belt passes so as to divide the first belt into a shoulder restraining section and a lap restraining section;
   a belt retractor mounted in said vehicle to retract said second belt;
   a belt supporting member constructed of a resilient wire and connected to an inner side of said door, said belt supporting member including a base portion fixed to said inner side of the door, a fulcrum portion extending from said base portion, a hair-pin portion extending downward and inward from said fulcrum portion to form a hair-pin construction with a curved lower portion, a straight portion extending upwardly from said hair-pin portion while making an obtuse angle relative to said hair-pin portion, and a belt supporting portion extending from said straight portion for supporting thereon a portion of said lap restraining section, the connection of said belt supporting member to said door being such that when no external force is applied to the belt supporting member, the hair-pin portion is raised by a certain angle from the inner side of said door permitting said straight portion to lie on the inner side of said door by making said fulcrum portion act as a fulcrum; and a blocking member mounted to said vehicle at a portion with which said curved, lower portion of said hair-pin portion is engageable upon closing of the door.

2. A passive seat belt arrangement as claimed in claim 1, in which the belt supporting portion has a hooked portion by which said lap restraining section is prevented from coming off the belt supporting member.

3. A passive seat belt arrangement as claimed in claim 1, in which said fulcrum portion is a straight portion which is parallel with said belt supporting portion.

4. A passive seat belt arrangement as claimed in claim 1, in which said belt supporting member is constructed of an endless resilient wire.

5. A passive seat belt arrangement as claimed in claim 1, in which said belt retractor has therein an emergency locking mechanism which inhibits the drawing of the second belt therefrom upon sensing abnormally high deceleration of the vehicle.

* * * * *